United States Patent [19]

Snowbarger et al.

[11] Patent Number: 5,272,702
[45] Date of Patent: Dec. 21, 1993

[54] INTEGRITY MAPPING IN DATA COMMUNICATION SYSTEM

[75] Inventors: Jim L. Snowbarger; Harold W. Halbleib, both of Marshalltown, Iowa

[73] Assignee: Fisher Controls International, Inc., Clayton, Mo.

[21] Appl. No.: 740,313

[22] Filed: Aug. 5, 1991

[51] Int. Cl.$^5$ .............................................. H04J 3/16
[52] U.S. Cl. ................................. 370/85.4; 370/85.8; 370/95.2; 340/825.08; 371/8.1
[58] Field of Search ..................... 370/14, 15, 16, 85.1, 370/85.4, 85.7, 85.8, 85.9, 85.11, 85.13, 85.14, 94.1, 95.1, 95.2; 340/825.03, 826, 827, 825.06, 825.07, 825.08, 825.54; 371/8.1, 8.2, 11.1, 11.2

[56] References Cited

U.S. PATENT DOCUMENTS

| | | | |
|---|---|---|---|
| 4,680,753 | 7/1987 | Fulton et al. | 370/85.8 |
| 4,782,483 | 11/1988 | Lambert et al. | 370/85.8 |
| 4,847,837 | 7/1989 | Morales et al. | 370/16 |
| 4,924,461 | 5/1990 | Amemiya et al. | 370/85.8 |
| 4,924,462 | 5/1990 | Sojka | 340/825.08 |

Primary Examiner—Douglas W. Olms
Assistant Examiner—Alpus H. Hsu
Attorney, Agent, or Firm—Marshall, O'Toole, Gerstein, Murray & Borun

[57] ABSTRACT

A device for communicating with other devices over a communication system is disclosed which has the capability of being a segment reporter and if it is not a segment reporter, of determining when it should become a segment reporter. The device includes a transmitter and receiver such that if the device is a segment reporter, it can transmit periodically a report request message requiring other devices to transmit report messages back to it and it can transmit an integrity map to all other devices based upon the report messages which it received from those devices. If the device is not a segment reporter, it can transmit report messages back to the segment reporter in response to a report request message and it can monitor the segment reporter in order to assume the segment reporting function if the segment reporter fails. The device will store the integrity map it receives from the segment reporter.

9 Claims, 11 Drawing Sheets

FIG. 10

HIGHWAY PACKET

| FC<br>1 BYTE | DA<br>6 BYTE | SA<br>6 BYTE | DLSAP<br>1 BYTE | SLSAP<br>1 BYTE | LC<br>1 BYTE | HL<br>1 BYTE | CT<br>1 BYTE | CC<br>1 BYTE | USV<br>2 BYTE | MT<br>2 BYTE | UU<br>4 BYTE | SR<br>1 BYTE | DATA<br>VARIABLE<br>LENGTH |
|---|---|---|---|---|---|---|---|---|---|---|---|---|---|
| 1 | 2 | 3 | 4 | 5 | 6 | 7 | 8 | 9 | 10 | 11 | 12 | 13 | |

WHO'S THERE DATA

| 0 BYTE |
|---|

FIG. 11

I'M HERE DATA

| 1 BYTE |
|---|

FIG. 12

SEGMENT MAP DATA

| SN<br>1 BYTE | SEG. N.<br>1 BYTE | MAP TYPE<br>1 BYTE | II<br>64 BYTE |
|---|---|---|---|

FIG. 13

NEIGHBOR CHANGE DATA

| SD<br>1 BYTE | ED<br>1 BYTE |
|---|---|

FIG. 14

INTEGRITY MAPPING IN DATA COMMUNICATION SYSTEM

FIELD OF THE INVENTION

The present invention relates to a fault tolerant data communication system in which each device (i.e., station) in the communication system can function as either a map reporting device or as an integrity responding device. If a device functions as a map reporting device, it determines the integrity of other devices in the system and broadcasts a map of the integrity of those devices. If a device functions is an integrity responding device, it reports its integrity to the map reporting device and monitors the integrity of the map reporting device in order to assume the functions of the map reporting device should the map reporting device fail. A priority arrangement may conveniently be used to determine which device is a map reporting device and which device will become a map reporting device if the current map reporting device fails.

BACKGROUND OF THE INVENTION

Communication systems, interconnecting numerous devices, such as sensors, controllers, terminals and the like, by a communication channel are used in a wide variety of applications such as process control, building energy management, reservations systems, and the like. The communication channel of such systems typically comprises a twisted pair of wires or a coaxial cable which interconnects the plurality of devices in the system. Each device on the communication channel is given an individual address so that messages can be directed from one device to another. Such messages may contain information, requests for information or commands. These messages involve various formats, but typically include the address of the destination device to which the message is being sent, the source address of the device issuing the message, a control frame indicating the type of message which is being transmitted, and data frames for containing data which is to be communicated by one device to another. Other frames, such as those used for parity checking, for indicating the start of a message and for indicating the end of a message, can be, and often are, included in the message. Each device on the communication channel, upon receipt of a message, compares the destination address contained in the message with its own address to determine whether or not it is intended to be the recipient of the message from the source device. If it is, it appropriately processes the message.

These systems have many advantages. For example, installation of such data communication systems as compared to hardwired systems is much easier. Instead of connecting each device by a separate pair of wires to each other device, only one pair of wires or a coaxial cable needs to run throughout the system. Also, such a system allows communication over long distances and can use existing data carriers such as telephone lines or satellite links in order to support data communication.

Various protocols have been developed which govern access by each device to the communication channel and to minimize the contention that would otherwise result when two or more devices attempt to transmit messages during overlapping time periods. One such protocol utilized by the present invention is a token passing protocol defined by IEEE standard 802.4. According to this protocol, any device having the token is allowed to transmit over the communication channel until either it has transmitted all of its information or a predetermined amount of time has elapsed, after which the device passes the token to the next station on the communication channel. In such a system, it is advantageous to provide in each device a list indicating the integrity of each other device in the communication system. Thus, a device need not make an attempt to communicate with a failed station.

SUMMARY OF THE INVENTION

In this type of communication system, provision must be made to preclude a failure of the device responsible for broadcasting the list from interrupting or terminating the data communication process. Accordingly, a device for communicating with other devices over a communication system according to the present invention has the capability of being an integrity map reporter and, if it is not an integrity map reporter, of determining when it should become an integrity map reporter. This device includes a transmitter and receiver such that, if the device is an integrity map reporter, it can transmit periodically an integrity report request message requiring other devices to reply by transmitting integrity report messages back to it. Integrity report messages are used by the integrity map reporter to build an integrity map which it then transmits to those other devices. If the device is not a map reporter, the device will transmit integrity report messages back to the map reporter in response to an integrity report request message, will monitor the map reporter and may, if appropriate, assume the map reporting function if the map reporter fails, and will store the integrity maps it receives from the map reporter.

This device can be connected together with other devices by a segment communication channel to form a communication segment. This segment can communicate over a network communication channel with other segments similarly formed. In the preferred embodiment, a device in each segment is designated to act as a segment reporter for determining the integrity of the devices in its segment. An integrity map is built by the designated device and is broadcast by it to all segments. The designated device may also broadcast the integrity map for its segment. Preferably, each device receives and stores the integrity maps from all segments.

Each device may also include the capability of immediately broadcasting a neighbor change message indicating that a neighboring device has failed. Other devices receiving this message can automatically update their stored integrity maps without having to wait for an updated integrity map for that segment to be broadcast to the network.

BRIEF DESCRIPTION OF THE DRAWINGS

These and other features and advantages will become more apparent from a detailed consideration of the invention when taken in conjunction with the drawings in which:

FIG. 10 illustrates a message packet showing a preferred message format that may be transmitted by the devices shown in FIG. 1; and FIGS. 11-14 illustrate various data frames of the message packet shown in FIG. 10.

DETAILED DESCRIPTION

Figure 1:
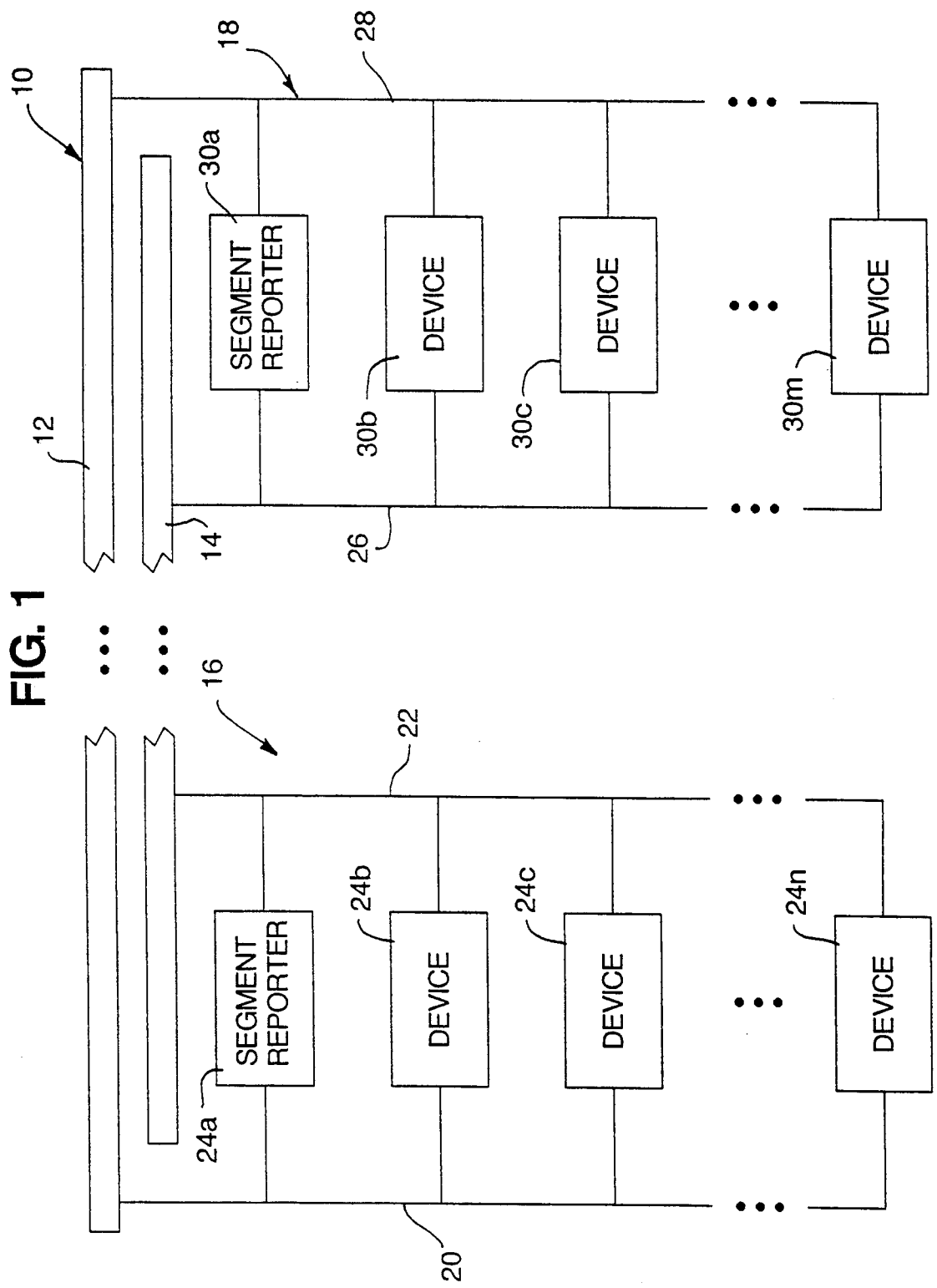
FIG. 1 is a schematic block diagram of a communication system according to the present invention.

In FIG. 1, a data communication system 10 according to the present invention includes redundant primary and secondary network communication channels 12 and 14. Connected to primary and secondary communication channels 12 and 14 are a plurality of devices grouped into segments 16 and 18. Segment 16 includes a primary segment communication channel 20 connected to primary network communication channel 12 and secondary segment communication channel 22 connected to secondary network communication channel 14. Each device in segment 16 is connected to each of the segment communication channels 20 and 22 so that if one device cannot communicate with another device over the primary channel, the one device can use the secondary channel for communication.

Segment 16 further includes segment reporter 24a and devices 24b-24n with n indicating that segment 16 can contain any number of devices. Although each of the devices 24a-24n may be structurally different and may perform different functions, the communication section (described below) for each device is the same.

Similarly, segment 18 includes a secondary segment communication channel 26 connected to secondary network communication channel 14 and primary segment communication channel 28 connected to primary network communication channel 12. Each device in segment 18 is connected to each of the segment communication channels 26 and 28 so that if one device cannot communicate with another device over the primary channel, the one device can use the secondary channel for communication. The devices in segment 18 include segment reporter 30a and devices 30b-30m with m indicating that segment 18 can contain any number of devices. Although each of the devices 30a-30m may be structurally different and perform different functions, the communication section for each device is the same.

According to the preferred embodiment, any device in a segment is capable of being a segment reporter. Thus, for example, if device 24b monitors segment reporter 24a and detects a failure, device 24b can assume the reporting responsibilities of segment reporter 24a for segment 16. Any protocol may be used for determining which device in a segment should assume the reporting responsibilities if the current segment reporter fails. As a matter of convenience, the protocol of the preferred embodiment uses the device address as the mechanism for determining the next available device to assume reporting responsibilities. For example, if the current segment reporter fails, the device having the next highest address in the segment will assume the segment reporting responsibilities. Similarly, if segment reporter 30a in segment 18 fails, the device with the next highest address will assume the segment reporting responsibilities for segment reporter 30a.

The segment reporting responsibilities of the segment reporter include transmitting a report request message, here conveniently referred to as a "who's there" message, to all devices in its segment. Each device in the segment replies with a report message which may be referred to as an "I'm here" message. The segment reporter keeps track of all of the "I'm here" messages returned by the devices in its segment and notes any devices which fail to return an "I'm here" message. The segment reporter then builds a segment map indicating the integrity of each device in the segment and broadcasts that map not only to each device in the segment, but also over the network communication channel to all other segments in data communication system 10. Each device in data communication system 10 stores all of the integrity maps which it receives so that it is aware of the devices which can communicate with it.

This integrity map building process is performed for each of the primary and secondary communication channels independently of one another. Accordingly, the segment reporter for the primary channel will transmit a "who's there" message over its primary segment communication channel to its own segment and the devices will respond with "I'm here" messages over that same channel to all other segments. The segment reporter will transmit its primary channel segment map over its primary segment communication channel to its own segment and over its primary network communication channel to all other segments. Similarly, the segment reporter for the secondary channel will use the same process for building and transmitting a segment map for the secondary channel. The segment reporter for the primary channel may not necessarily be the segment reporter for the secondary channel. For example, a defect in a device may prevent it from successfully communicating over one channel but not the other; thus, while one device functions as a segment reporter for one channel, another device may assume reporting responsibilities for the other channel. Also, it is possible for a responding device to be able to transmit an "I'm here" message over one of its channels, but not the other. Accordingly, the segment maps built by the segment reporter for each channel will indicate that this device is a good device for the one channel, but not for the other channel.

Accordingly, each device in the system receives and stores in memory the maps it receives over its two channels. Thus, by checking its memory, each device can determine over which channel it can transmit and receive if it wishes to communicate with another device.

As indicated above, the protocol which governs the right of any device within a segment 16 or 18 to communicate over a segment communication channel 20, 22, 26 or 28 or the right of any segment within data communication system 10 to communicate over a network communication channel 12 or 14 is governed by IEEE standard 802.4, although any protocol can be used with the present invention. According to this protocol, each segment communication channel is connected to its respective network communication channel by a token bridge which collects messages to be transmitted over its associated network communication channel from its corresponding segment and which transmits those messages when that bridge has the token. After the messages are transmitted, the bridge will pass the token to the next network station which could be a bridge or network device. Similarly, each device is connected to its respective segment communication channels by a similar token bridge which collects messages from its associated device and transmits the collected messages when that bridge has the token. After the messages are transmitted, the bridge will pass the token.

Figure 2:
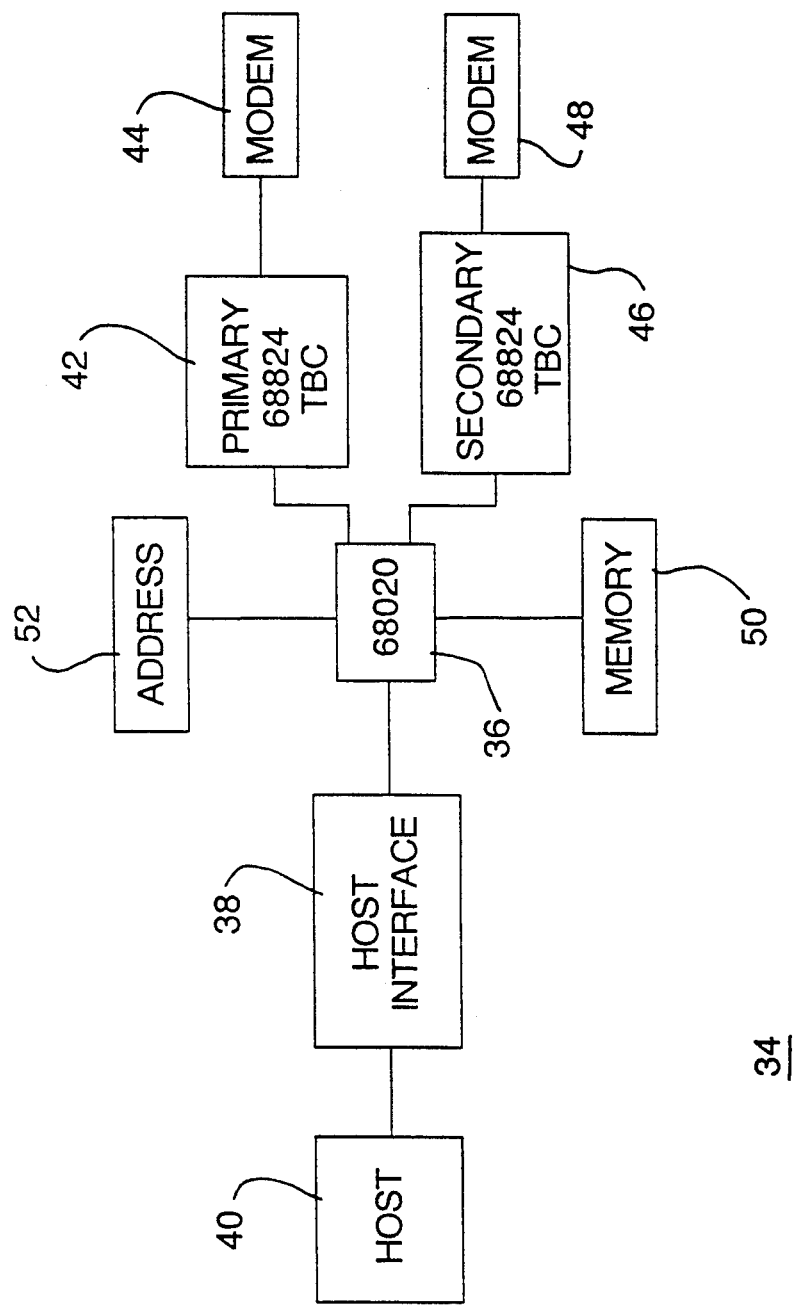
FIG. 2 is a schematic block diagram illustrating a communication section of each of the devices shown in FIG. 1.

Each device 24a-24n and 30a-30m shown in FIG. 1 has a communication section permitting a device to communicate with other devices in its segment or in other segments. FIG. 2 illustrates the communication section resident in each device. This communication section 34 includes a processor 36 connected through interface 38 to its host device 40 which may be a process controller, terminal, or the like. Processor 36 supports communication between host device 40 and other devices in its segment and/or other segments. Communication section 34 transmits and receives messages over a primary channel, such as primary segment communication channel 20, through primary token bus controller 42 and modem 44 and transmits and receives messages over a secondary channel, such as secondary segment communication channel 22, through secondary token bus controller 46 and modem 48. Communication section 34 also includes memory 50. An address device 52, such as address switches, stores a unique address for the device. Accordingly, when each device receives a message packet, it compares the destination address contained in the message packet to its address stored in device 52 to determine if it should process the information contained in the message packet. Also, when a device transmits a message packet, it can load its address stored in device 52 into the source address field of the message packet that it will transmit.

Furthermore, a device, by way of its communication section 34, will first attempt to transmit over the primary segment communication channel. If it is unable to successfully communicate over primary segment communication channel, it will then communicate over secondary segment communication channel.

Figure 3:
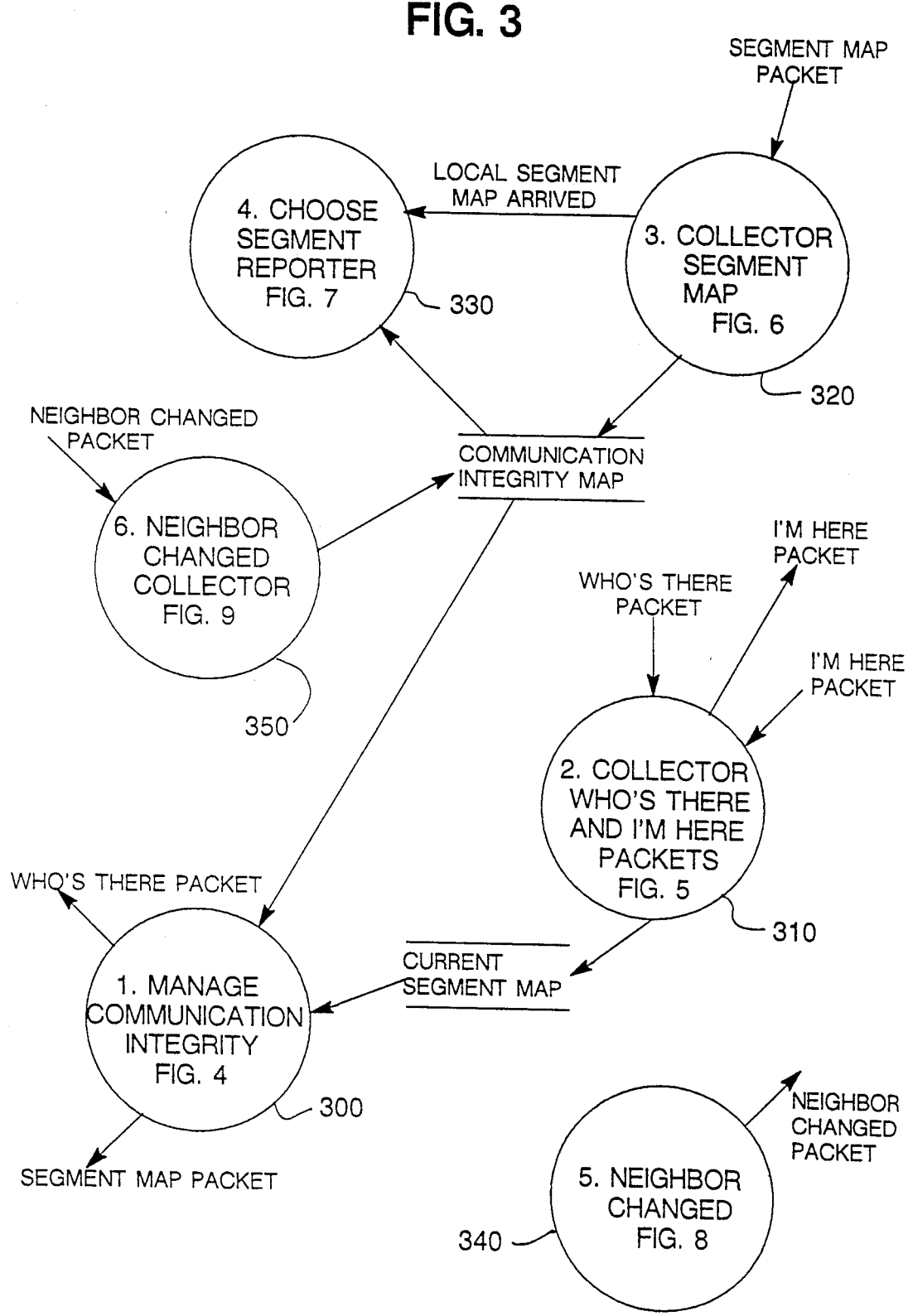
FIG. 3 illustrates a functional overview of the present invention.

Each device contains a communication section similar to communication section 34 and also contains the programming represented by FIGS. 3-9. Each communication section 34 contains two programs, such as the program shown in FIGS. 3-9, one for each channel, so that the programs can work independently. However, since the two programs are identical, only one is shown. FIG. 3 illustrates the relationship between the routines shown in FIGS. 4-9.

As shown in FIG. 3, the device which is currently the segment reporter for the primary segment communication channel periodically (once per second, for example) initiates an integrity map building cycle (at 300) by transmitting a "Who's There" message packet over its primary segment communication channel. Each device in the segment will receive this message packet (at 310) and will transmit an "I'm Here" message packet over the primary segment communication channel.

While each device receives at 310 the "I'm Here" message packet, the segment reporter responds to it by applying the "I'm Here" message packet data to the current integrity map which it is building. When the map is built, the segment reporter transmits at 300 the segment integrity map packet. This packet is received at 320 by each device in each segment. Each device stores each of the segment integrity maps which it receives. Also, each device in a segment monitors the segment map transmitted by the segment reporter of its segment to determine at 330 whether it should become the segment reporter for the primary channel. Each device also monitors at 340 its neighboring devices and will transmit a "Neighbor Changed" message packet if neighboring devices have experienced a change in integrity. Thus, a change in integrity of a device can be announced without waiting for the transmission of an integrity map covering that device. Accordingly, each device receives at 350 the neighbor changed packet and stores the integrity of the devices by that packet in its stored integrity maps.

The segment reporter for the secondary segment communication channel will similarly build and transmit an integrity map for the secondary segment communication channel. A segment reporter for one channel may be the same as, or different than, the segment reporter for the other channel. By storing integrity maps for both the primary and secondary channels, each device can determine, by checking its stored maps, whether it can communicate with any other device first over the primary channel or, if it cannot, over the secondary channel.

MANAGE COMMUNICATION INTEGRITY

Figure 4:
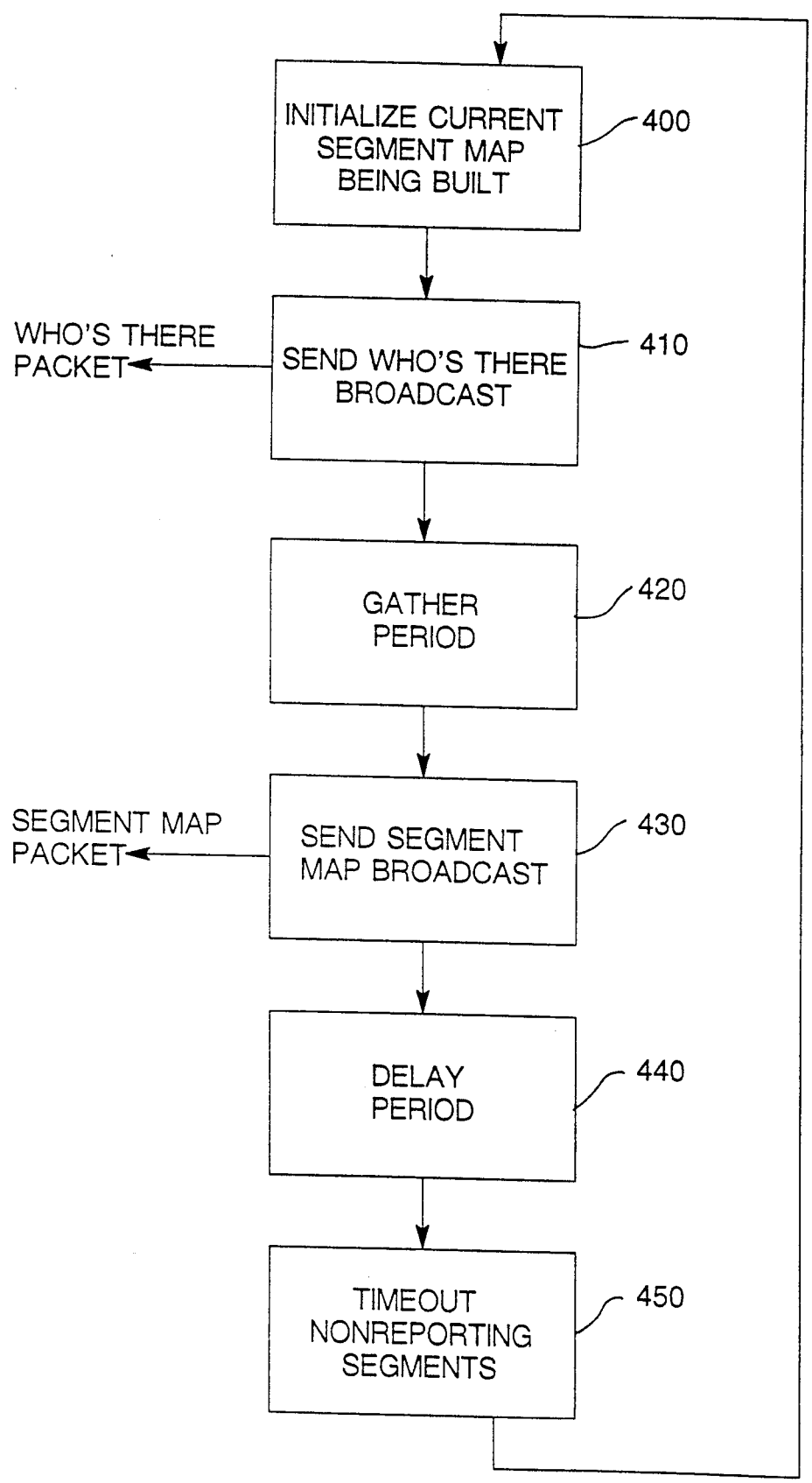
FIGS. 4-9 are flow diagrams illustrating the operation of each of the devices shown in FIG. 1.

As shown in more detail in FIG. 4, block 400 of the device which is currently the segment reporter for its segment initiates the building of a current integrity map. Upon initialization, the segment reporter transmits a "who's there" message packet such as that shown in FIGS. 10 and 11. The first three fields (of the fourteen shown) of this packet are defined by IEEE standard 802.4. The first field is a function code field which defines the packet and its priority. The second field contains the destination address of the device to which the packet is directed. In the case of a "who's there" message, the destination address field will contain a global address encompassing all of the devices in the segment. The next field (3) contains the source address of the device issuing the message. In this case, the source address of a "who's there" message is the address of the segment reporter.

The next three fields relate to the link layer of the protocol as defined in IEEE standard 802.2. Accordingly, the fourth field of the packet shown in FIG. 10 is used to define the destination link service access point. This point may be, for example, an application program in the destination device to which a communication is being directed by an application program in a source device. The fifth field defines the source link service access point. This field can be used to define the software package within the source device from which the message is being directed. The sixth field is a link control byte and is set to the required code defined by IEEE standard 802.2.

The seventh field indicates the length of the header which is all of the message packet shown in FIG. 10 except the data field. The eighth field indicates whether confirmation of receipt of the message is required by the device whose address is contained in the second field. The ninth field contains a confirmation code which individually identifies a message packet. Thus, if there are multiple outstanding requests needing confirmation, the responding station will reflect back the confirmation code so that the requesting device will know the specific message to which the responding device is responding. The tenth field is a user code used in the application layer by an application program so that it can match up a request message with a corresponding response message. The eleventh field contains information on the type of message being transmitted. With regard to the current invention, this field will indicate whether the message shown in FIG. 10 is a "who's there" message, is an "I'm here" message, is an integrity map, or is a neighbor change message.

The twelfth field is unused and is set aside for future expansion. The thirteenth field indicates the particular software revision currently being used by the source device which has transmitted the message. Finally, the last portion of the message shown in FIG. 10 will contain data and has a variable length. In the case of a "who's there" message, such as shown in FIG. 11, the data portion of the message shown in FIG. 10 is blank.

As shown in FIG. 4, after block 410 of the segment reporter transmits the "who's there" message, block 420 will cause the segment reporter to wait for the gather period (which may be, for example, 100 milliseconds) while the segment reporter receives the "I'm here" messages from the other devices on the segment and while it builds its integrity map based upon the responses from those other devices. After the integrity map has been built for its segment, block 430 of the segment reporter will broadcast the segment map in the form of a message packet. This message packet will take the form of FIGS. 10 and 13. Accordingly, the source address in the message packet containing the segment integrity map will be a global address indicating that the message should be received and copied by not only all of the devices on the segment reporter's segment, but also by all other devices in all other segments.

As shown in FIG. 13, the segment map data contained in the data field of the message packet shown in FIG. 10 includes a first field containing the segment number of the segment to which the map relates. A second field contains a sequence number. The sequence number is a number assigned to a full integrity map message packet and to any "no change" integrity map message packets which immediately follow the full map message packet. For example, a segment integrity map reporter will transmit a full integrity map message packet because a device in its segment has experienced a change in integrity. The segment reporter will assign a sequence number to the sequence number field of this packet. If the next segment integrity map message packet indicates no changes in the integrity map, the segment reporter will assign the same sequence number to the sequence number field of this next segment integrity map message packet. If subsequently the segment reporter issues another full segment integrity map message packet, it will assign a new sequence number to the sequence number field in the message packet.

The sequence number is useful to other devices. If a device receives a segment integrity map message packet indicating no change and having a particular sequence number but the device had not received a full integrity map message packet with the same sequence number, the device will know that it has missed a previously-transmitted full map. It will then request the transmitting segment map reporter to retransmit a current full map.

A third field indicates the type of map contained in the segment map data. This field can be used to indicate whether the message contains a full integrity map or whether there has been no change since the last integrity map was transmitted. If there has been no change, there is no need to transmit a full map since each device can merely preserve the map for that segment which it previously stored in its memory. A fourth field, of a length which depends upon how many devices can be included in a segment, contains the integrity information of the devices on the segment. For the present embodiment, one nibble (i.e., one-half of a byte) is devoted to each device in the segment. The address of each device in the segment integrity map is simply the position of its nibble in this portion of the segment map message packet. Each nibble contains integrity information for its device. For example, one bit can be used to indicate the result of a device's self-test, one bit can be used to indicate whether the device is a redundant device, one bit can indicate if it is busy, and so on. The bytes in the current system may be eight bits, for example.

Block 440 of FIG. 4 causes the segment reporter to wait through a delay period (which may be, for example, 900 milliseconds). During this delay, the devices are free to conduct other communications and to receive and store segment maps from all other segments.

Block 450 provides a time out so that if an integrity map for a segment is not received after two cycles (for example, 2 seconds), each device for that segment is indicated as being bad. After the delay of block 440 and any required time out as provided by block 450, a new map building process is initiated. If none of the devices have changed since the last integrity map building process, i.e., no new device has been added to the segment and no current device has failed, the map-type field shown in FIG. 13 will indicate no change and the integrity field (II) will not be used. Thus, the segment map reporting process can be streamlined when no changes have occurred in a segment.

COLLECTOR WHO'S THERE AND I'M HERE PACKETS

Figure 5:
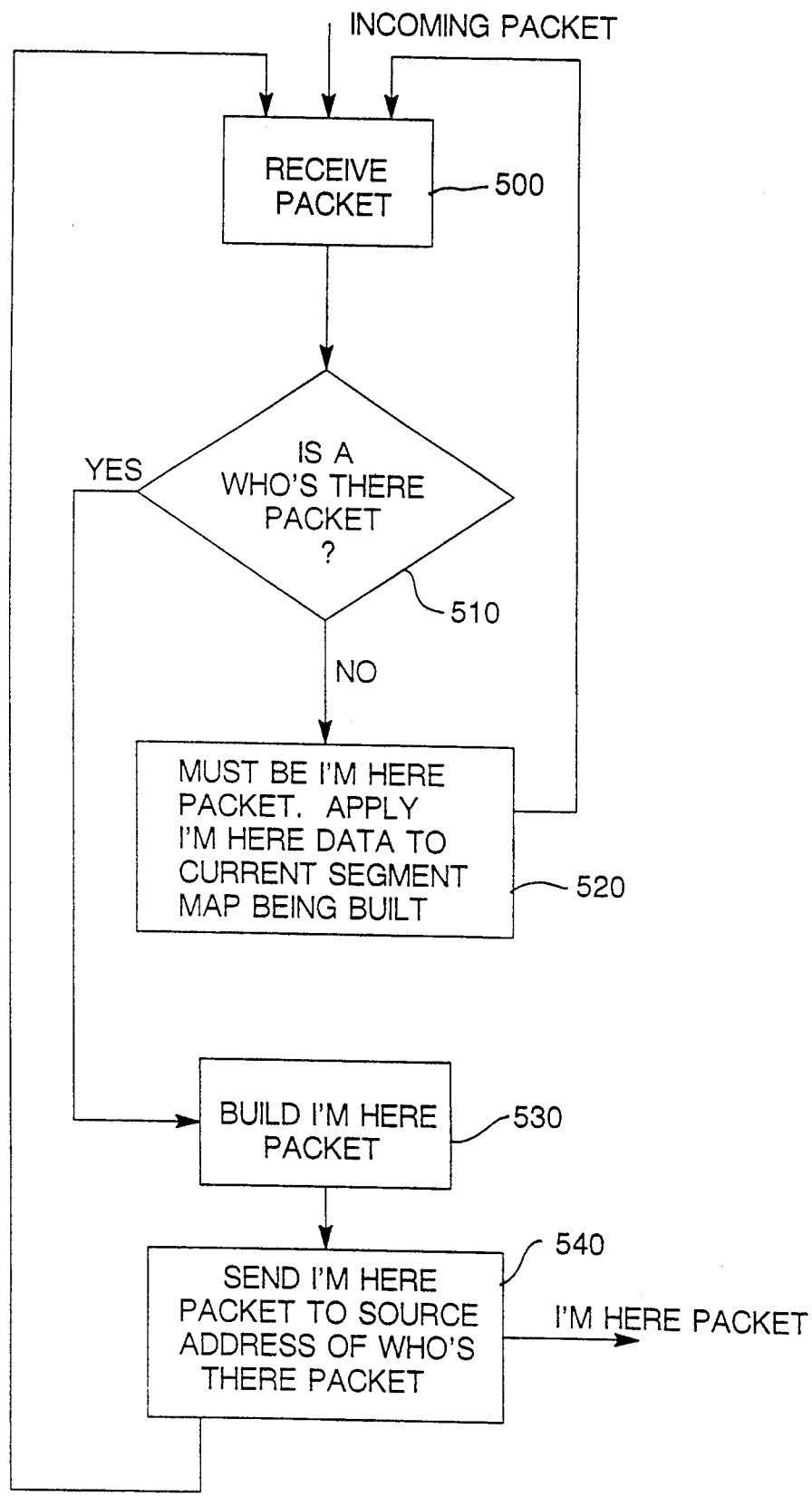

FIG. 5 shows how a device processes an incoming packet if that packet is either a "Who's There" packet or an "I'm Here" packet. Each device receives the packet at block 500. Decision diamond 510 will determine whether or not the received packet is a "Who's There" packet. If the received packet is an "I'm Here" packet, the segment reporter at block 520 will add this "I'm Here" data to the current segment integrity map which it is building and wait (return to block 500) for the next packet. If the received packet is a "Who's There" packet, block 530 of each device will build the "I'm Here" packet and block 540 of each such device will transmit this packet over the segment communication channel. The device will then wait for receipt of the next packet.

When a device transmits an "I'm Here" message packet, the data field 14 (FIG. 10) of the message packet contains one-half of a byte of information as shown in FIG. 12. This data field can be used to provide any desired information, although this field can be left blank (i.e., not used) because a message of the "I'm Here" type indicates a good device by simply being transmitted by that device.

COLLECTOR SEGMENT MAP

Figure 6:
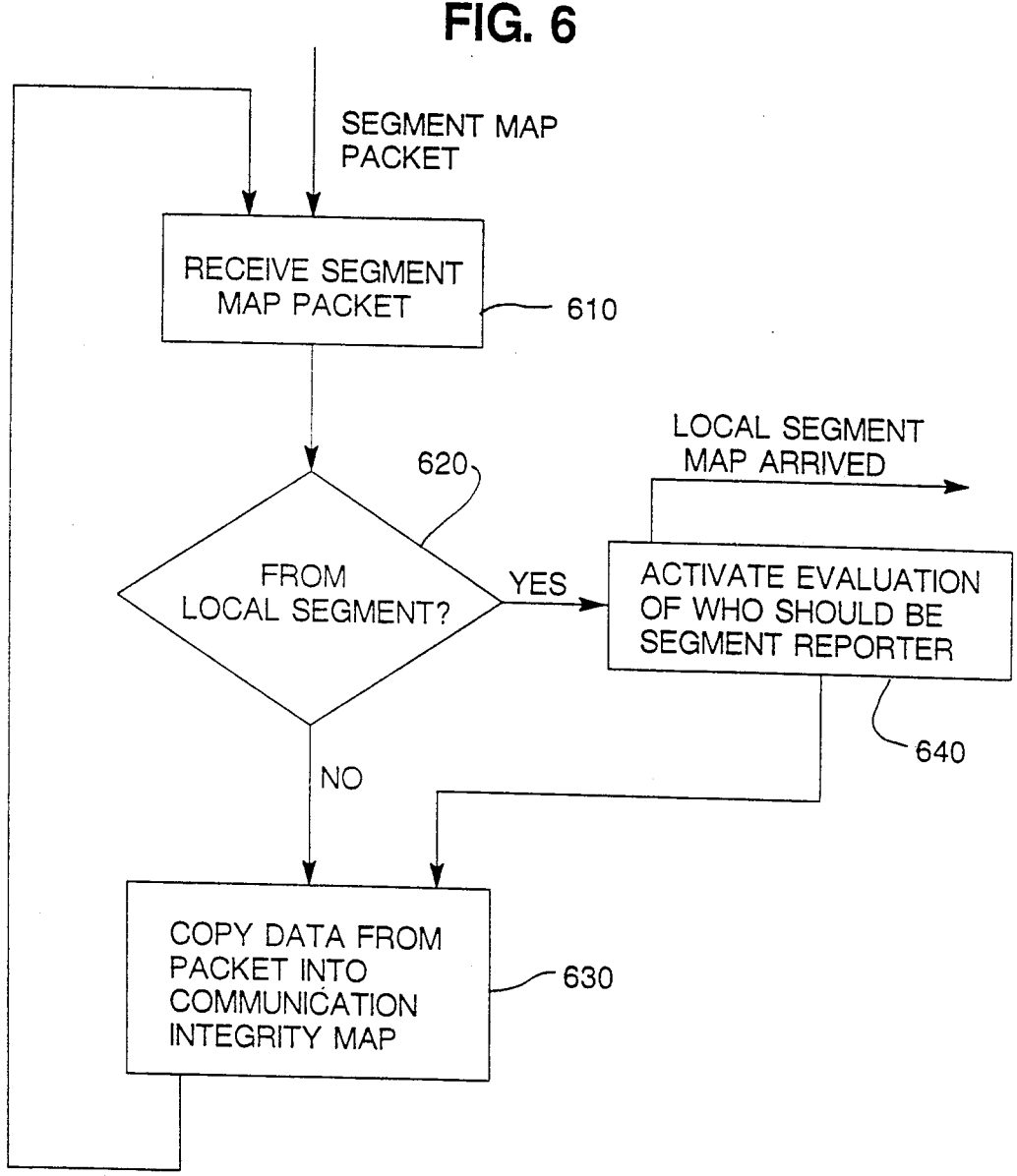

FIG. 6 shows how a device processes an incoming message packet if that incoming message packet is a segment map. When a segment integrity map is received at block 610, decision diamond 620 of a device will decide whether or not the received packet is a map of its own segment or if it is a map of another segment. If the packet is not from its own segment, then the packet is from another segment and the device at block 630 will cause the device to copy the data into memory. If the received packet is from the local segment, however, then the device will activate an evaluation routine to determine who should be segment reporter and at the same time copy the information into memory.

CHOOSE SEGMENT REPORTER

Figure 7:
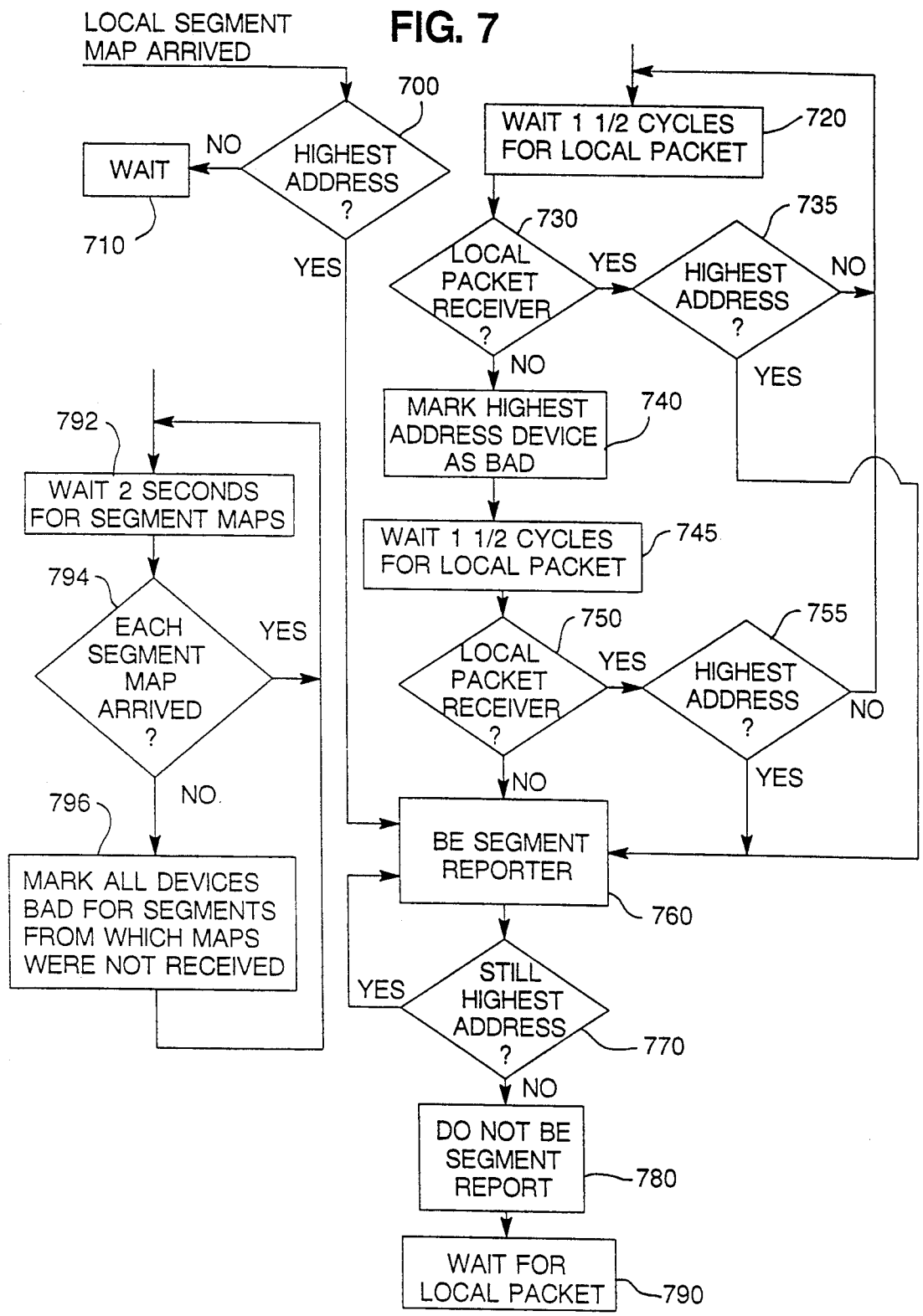

As shown in FIG. 7, if the received packet is a local segment integrity map, each device of that segment will determine at 700 whether its own address is higher than the source address in the received packet. If a device has an address higher than the source address contained in the received local segment integrity map packet, then a device having a lower address is currently functioning as segment report. Accordingly, block 760 of the device having an address higher than the device currently acting as segment reporter will cause the device having the higher address to take over and become segment reporter. All devices which do not have an address higher than the address of the current segment reporter will then wait at 710 for subsequent local segment integrity map packets.

As indicated at block 720, each device will wait 1 and ½ cycles for the receipt of a local segment map packet. If this packet is received during 1 and ½ segment map building cycles, as determined at 730, each device in the segment will compare its address against the address contained in the local segment map packet, as indicated at 735. At 735, the devices which do not have an address higher than the address in the received packet will return to wait for the next such packet; but, the device which does have a higher address will become segment reporter at 760.

If, however, these 1 and ½ cycles expire before a local segment map packet is received, the devices at 740 will note in their memories that the device currently having the highest address on the segment is a bad device and will wait another 1 and ½ cycles at 745. If, at 750, a local segment map packet is received during this additional 1 and ½ cycles, each device in the segment will again compare its address with the address contained in the packet at 755. Those devices not having a higher address will return to wait for the next local segment map packet; but, the device having a higher address will become address reporter at 760.

If no such message packet is received during the additional 1 and ½ cycles, every device in the segment, which is capable of sustaining communication (i.e., it has integrity), will become segment reporter. Each such device will transmit a segment map. Each such device will receive the maps from all the other devices in its segment and will compare its address to the addresses contained in the received packets at 700. Thus, only the device having the highest address in the segment will continue to be the segment reporter for that segment and the other devices will return to wait at 710 for the next local segment map packet.

Also as shown in FIG. 7, each device waits at 792 for 2 seconds (i.e., two map building cycles). If all maps are received for all segments, each device returns to wait another 2 cycles as indicated at 794. If, however, maps are not received from all segments, each device at 796 will mark its memory to indicate that the devices in the segments from which maps have not been received are bad devices.

The device which is currently a segment reporter will periodically test at 770 to see whether it still has the highest address of the currently-active devices in its segment. If its address is highest, it will continue to be segment reporter. If its address is no longer the highest, then the device at 780 will relinquish the segment reporting function and will wait at 790 for the next local packet to begin the evaluation process over again.

NEIGHBOR CHANGED

In the preferred embodiment, each device in the system has the ability to issue a message packet, if its neighbor device has failed, without waiting for a segment map to be built and transmitted. This feature speeds up the process of notifying the network that a device has failed. A successor device is a device which has a lower address than the device under consideration and a predecessor device is a device which has a higher address. If one device attempts to pass the token to its next successor device and this successor device fails to accept the token, the token bus controller of the one device will generate an interrupt and will attempt to pass the token to the next following successor device and so on until a successor device accepts the token.

Figure 8:
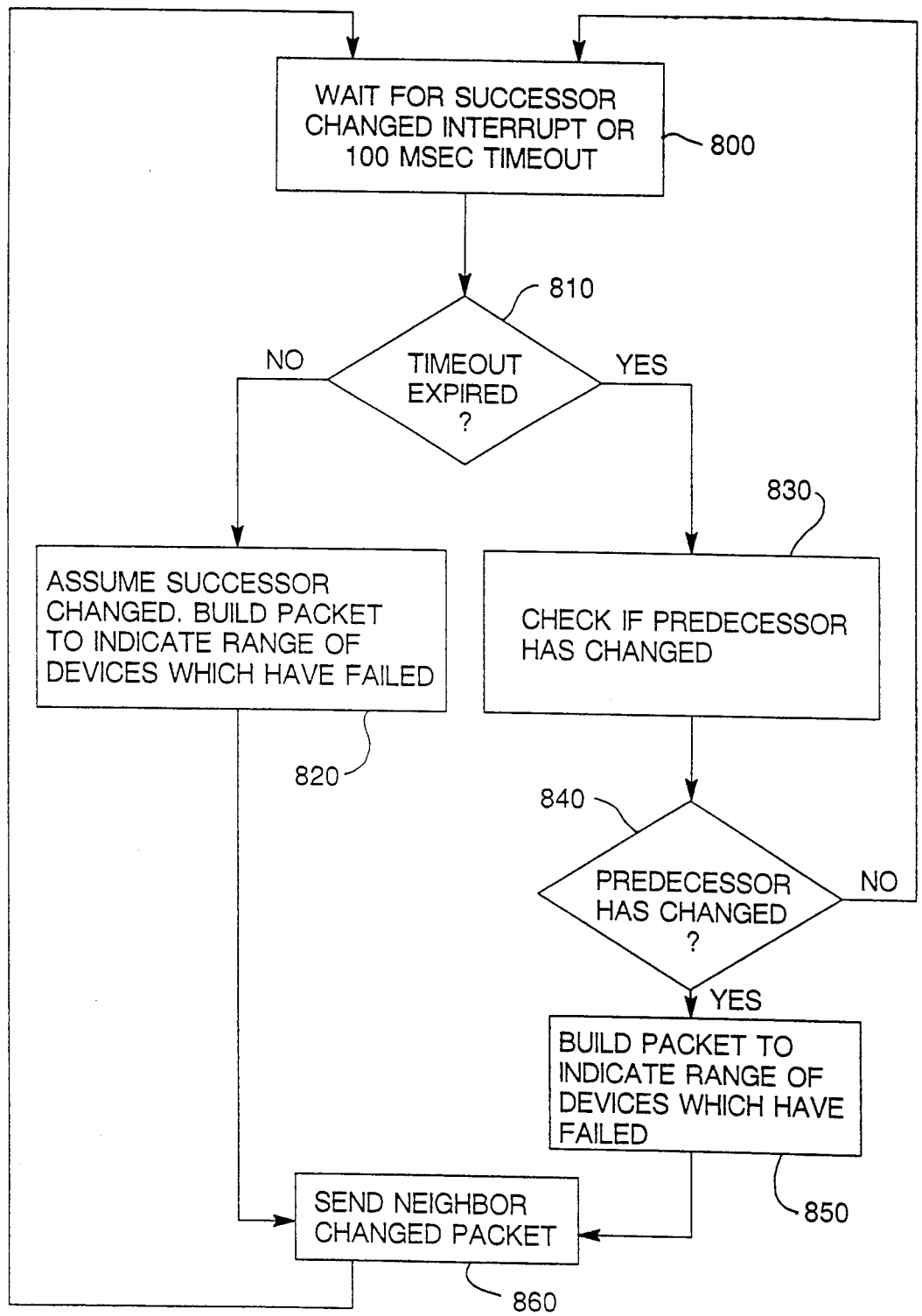

Accordingly, at block 800 of FIG. 8, if such an interrupt is generated and the timeout at 810 has not occurred, the device will assume that at least one successor device has failed and block 820 will cause the device attempting to pass the token to build a message packet according to FIGS. 10 and 14. The data field in a neighbor change message packet includes two frames, one for indicating the address of the start device which is the first non-failed device upstream of the failed device or devices, and the other for indicating the address of the end device which is the first non-failed device downstream of the failed device or devices. The device creating this packet will then transmit it at 860 before returning to block 800 to wait.

On the other hand, if the predecessor evaluation period (which may be, for example, 100 milliseconds) has expired, the device will check at 830 to see whether or not its predecessor device has failed. The predecessor of a device has failed if an attempt was made to pass the token to the predecessor by a station upstream of the predecessor and that attempt failed. Therefore, if the device gets the token from a device which is not its predecessor, the predecessor must have failed. If the predecessor device has not failed, the device will reenter its waiting mode at 800. However, if the predecessor device has failed, the device will build at 850 an appropriate neighbor change message packet and globally transmit it at 860.

A device which enters the token ring for the first time or which has just recovered from a failure can transmit a neighbor change message with both the start and end device addresses set to its own address. Thus, all other devices will store the address of this device in their integrity maps.

NEIGHBOR CHANGED COLLECTOR

Figure 9:
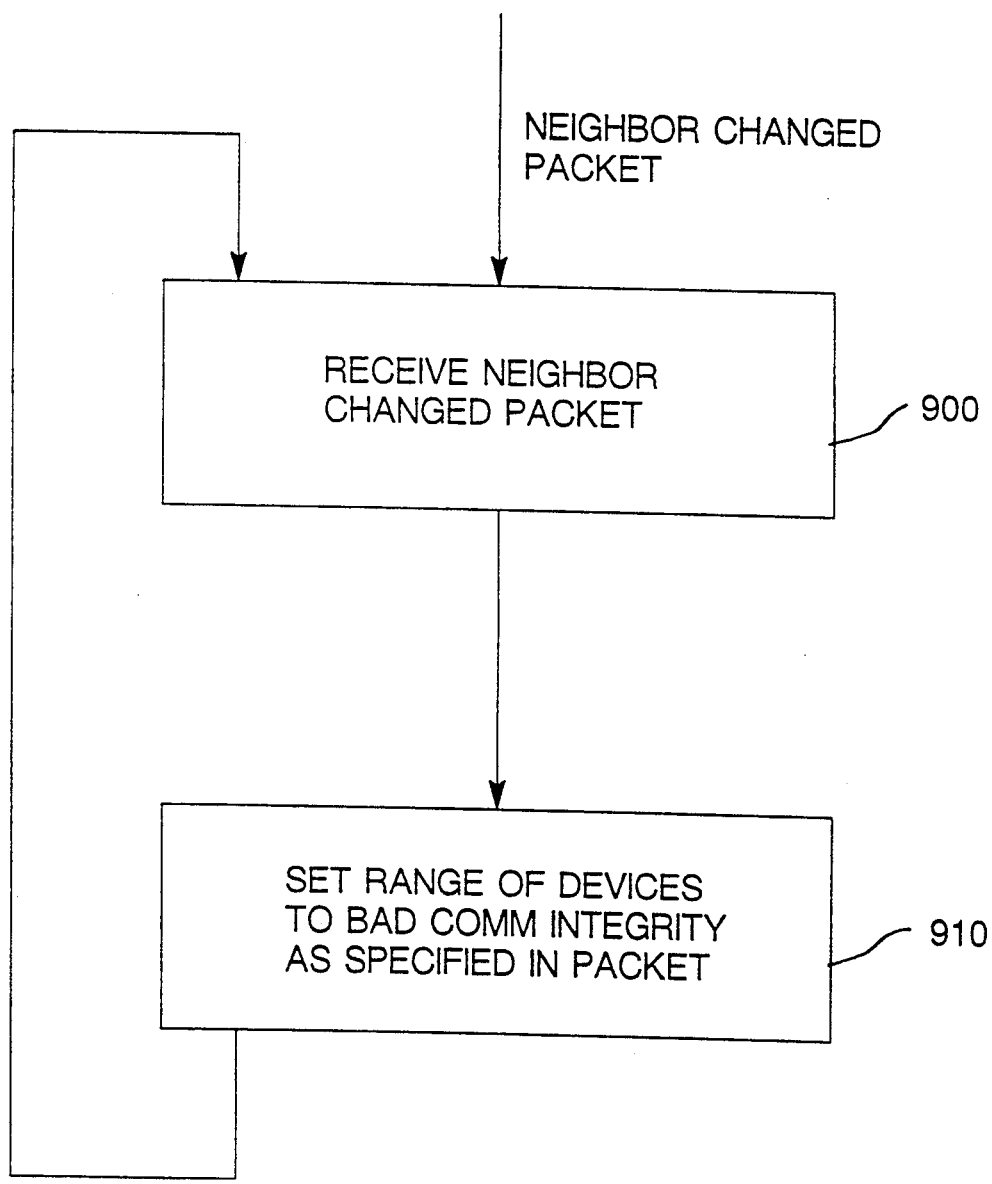

As shown in FIG. 9, each device receiving the neighbor change packet at block 900 will adjust its stored integrity maps at block 910 by making appropriate adjustments to the storage locations associated with the devices between the start device and end device indicated in the neighbor changed message packet.

This communication system provides device integrity information to all devices in the system. The devices are divided into segments which increase efficiency of the reporting process by reducing the time during which device integrity is determined and by restricting integrity map-building messages to the segment. Any device in a segment is capable of being a segment reporter so that if the segment reporter which has the obligations of determining the integrity of the devices in its segment and of reporting that integrity to other segments fails, another device in the segment can assume these functions; thus, the system is essentially masterless. Any device in the system can report a failed neighbor device without waiting for the full map building and transmission cycle to have elapsed. Furthermore, foreign devices (that is, devices which cannot participate in building and transmitting integrity maps) do not interfere with the communication process.

What is claimed is:

1. A communication system comprising:

network communication channel means for conducting messages thereon;

at least first and second segment communication channel means connected to said network communication channel means, said first and second segment communication channel means conducting messages thereon;

a plurality of first device means connected to said first segment communication channel means to define a first segment;

a plurality of second device means connected to said second segment communication channel means to define a second segment;

wherein one of said first device means is designated as a first segment reporter means for (a) periodically transmitting a first segment integrity report request message requiring each of all others of said first device means to transmit an integrity report message and (b) globally transmitting a first segment integrity map to all said first and second device means in response to said integrity report messages from said all others of said first device means;

wherein one of said second device means is designated as a second segment reporter means for (a) periodically transmitting a second segment integrity report request message requiring each of all others of said second device means to transmit an integrity report message and (b) transmitting a second segment integrity map to all said first and second device means in response to said integrity report messages from said all others of said second device means;

wherein each of said all others of said first device means is arranged for transmitting an integrity report message to said first segment reporter means in response to said first segment integrity report request message, for storing said first and second segment integrity maps, and for monitoring said first segment reporter means so that another of said first device means can become a segment reporter means for said first segment communication channel means if said first segment reporter means fails; and wherein each of said all others of said second device means is arranged for transmitting an integrity report message to said second segment reporter means in response to said second segment integrity report request message, for storing said first and second segment integrity maps, and for monitoring said second segment reporter means so that another of said second device means can become a segment reporter means for said second segment communication channel means if said second segment reporter means fails.

2. The communication system of claim 1 wherein each device means of said plurality of first device means comprises address means establishing an individual address uniquely identifying said first device means, the addresses of said first device means being arranged sequentially such that if said first segment reporter means fails, then a first device means which has an address next to the address of said first segment reporter means becomes segment reporter means for said first segment communication channel means, and wherein each device means of said plurality of second device means comprises address means establishing an individual address uniquely identifying said second device means, the addresses of said second device means being arranged sequentially such that if said second segment reporter means fails, then a second device means which has an address next to the address of said second segment reporter means becomes segment reporter means for said second segment communication channel means.

3. The communication system of claim 2 wherein each device means of said plurality of first device means and each device means of said plurality of second device means comprises neighbor change means such that any device means can transmit a neighbor change message if said any device means has an address next to an address of a neighboring device means and said neighboring device means has failed.

4. The communication system of claim 3 wherein each device means of said plurality of first device means and each device means of said plurality of second device means, in response to said neighbor change message, adjusts said first and second segment integrity maps stored therein to indicate failure of said neighboring device means.

5. The communication system of claim 1 wherein each device means of said plurality of first device means comprises address means establishing an individual address uniquely identifying said first device means, the addresses of said first device means being arranged sequentially, wherein each device means of said plurality of said second device means comprises address means establishing an individual address uniquely identifying said second device means, the addresses of said second device means being arranged sequentially, and wherein each device means of said plurality of first device means and each device means of said plurality of second device means comprises neighbor change means such that any device means can transmit a neighbor change message if said any device means has an address next to an address of a neighboring device means and said neighboring device means failed.

6. The communication system of claim 5 wherein each device means of said plurality of first device means and each device means of said plurality of second device means, in response to said neighbor change message, adjusts said first and second segment integrity maps stored therein to indicate failure of said neighboring device means.

7. The communication system of claim 1 wherein said first segment communication channel means comprises first and second communication channels and said second segment communication channel means comprises third and fourth communication channels, wherein each of said plurality of first device means comprises redundancy means for transmitting and receiving messages over one of said first and second communication channels if communication over the other of said first and second communication channels has failed, and wherein each of said plurality of second device means comprises redundancy means for transmitting and receiving messages over one of said third and fourth communication channels if communication over the other of said third and fourth communication channels has failed.

8. The communication system of claim 7 wherein said first segment reporter means comprises a first communication channel segment reporter for transmitting a first communication channel integrity report request message over said first communication channel and for globally transmitting a first communication channel integrity map over said first communication channel, said first communication channel integrity map indicating integrity of all said first device means over said first communication channel, wherein said first segment reporter means further comprises a second communication channel segment reporter for transmitting a second communication channel integrity report request message over said second communication channel and for globally transmitting a second communication channel integrity map over said second communication channel, said second communication channel integrity map indicating integrity of all said first device means over said second communication channel, wherein said second segment reporter means comprises a third communication channel segment reporter for transmitting a third communication channel integrity report request message over said third communication channel and for globally transmitting a third communication channel integrity map over said third communication channel, said third communication channel integrity map indicating integrity of all said second device means over said third communication channel, and wherein said second segment reporter means further comprises a fourth communication channel segment reporter for transmitting a fourth communication channel integrity report request message over said fourth communication channel and for globally transmitting a fourth communication channel integrity map over said fourth communication channel, said fourth communication channel integrity map indicating integrity of all said second device means over said fourth communication channel.

9. The communication system of claim 1 wherein said first and second segment reporter means transmits respective first and second segment maps if at least a corresponding one of said first and second device means fails to report and otherwise transmits a no change message.

* * * * *

UNITED STATES PATENT AND TRADEMARK OFFICE
CERTIFICATE OF CORRECTION

PATENT NO. : 5,272,702
DATED : December 21, 1993
INVENTOR(S) : Snowbarger, et al.

It is certified that error appears in the above-indentified patent and that said Letters Patent is hereby corrected as shown below:

Col. 11, line 38 of Amended Claim 1, in paragraph 6,
    line 26, after "(b)" insert --globally--.

Signed and Sealed this

Twenty-fourth Day of May, 1994

Attest:

BRUCE LEHMAN

Attesting Officer     Commissioner of Patents and Trademarks